United States Patent [19]

Brook et al.

[11] 3,938,145

[45] Feb. 10, 1976

[54] FAST-SCANNING BROAD BAND RADAR SYSTEM

[75] Inventors: Marx Brook; Paul R. Krehbeil, both of Socorro, N. Mex.

[73] Assignee: The United States of America as represented by the Secretary of the Navy, Washington, D.C.

[22] Filed: June 3, 1974

[21] Appl. No.: 475,673

[52] U.S. Cl. ............................ 343/5 W; 343/17.2 R
[51] Int. Cl.² .......................................... G01S 9/60
[58] Field of Search .......... 343/5 W, 17.1 R, 17.2 R

[56] References Cited
UNITED STATES PATENTS

| | | | |
|---|---|---|---|
| 3,114,148 | 12/1963 | Lederman | 343/17.2 R X |
| 3,149,332 | 9/1964 | Kocher | 343/5 W X |
| 3,175,214 | 3/1965 | Ramsay et al. | 343/17.2 R X |
| 3,603,919 | 9/1971 | Moore | 343/17.2 R X |

*Primary Examiner*—T. H. Tubbesing
*Attorney, Agent, or Firm*—Richard S. Sciascia; Paul N. Critchlow

[57] ABSTRACT

Reflectivity estimates from clouds and other clutter targets normally require an averaging of a large number of independent radar pulse samples. If the radar generates noise pulses of a predetermined bandwidth and pulse length, a large number of returns can be derived and, when averaged over the full length of the pulse, the returns provide the desired reflectivity estimate. Considering a noise source whose spectrum in the frequency domain can be represented by a rectangular function of width $\beta$ (bandwidth), the properties of this function are such that the time ($\tau$) at which it first becomes zero is related to $\beta$ by $\tau = 1/\beta$. Time $\tau$ is the correlation time. If the pulse length T is made relatively long compared to the correlation time, it becomes possible to average or integrate within the pulse length T since the number of uncorrelated noise configurations is $T/\tau = \beta T$. For a noise pulse of one microsecond long ($T$) and a bandwidth ($\beta$) of 100 MHz, the number of independent noise configurations within the pulse is $100 \times 10^6 \times 10^{-6} = 100$. Averaging the 100 samples of one pulse provides a reliable reflectivity estimate or mean intensity value for the clutter.

6 Claims, 1 Drawing Figure

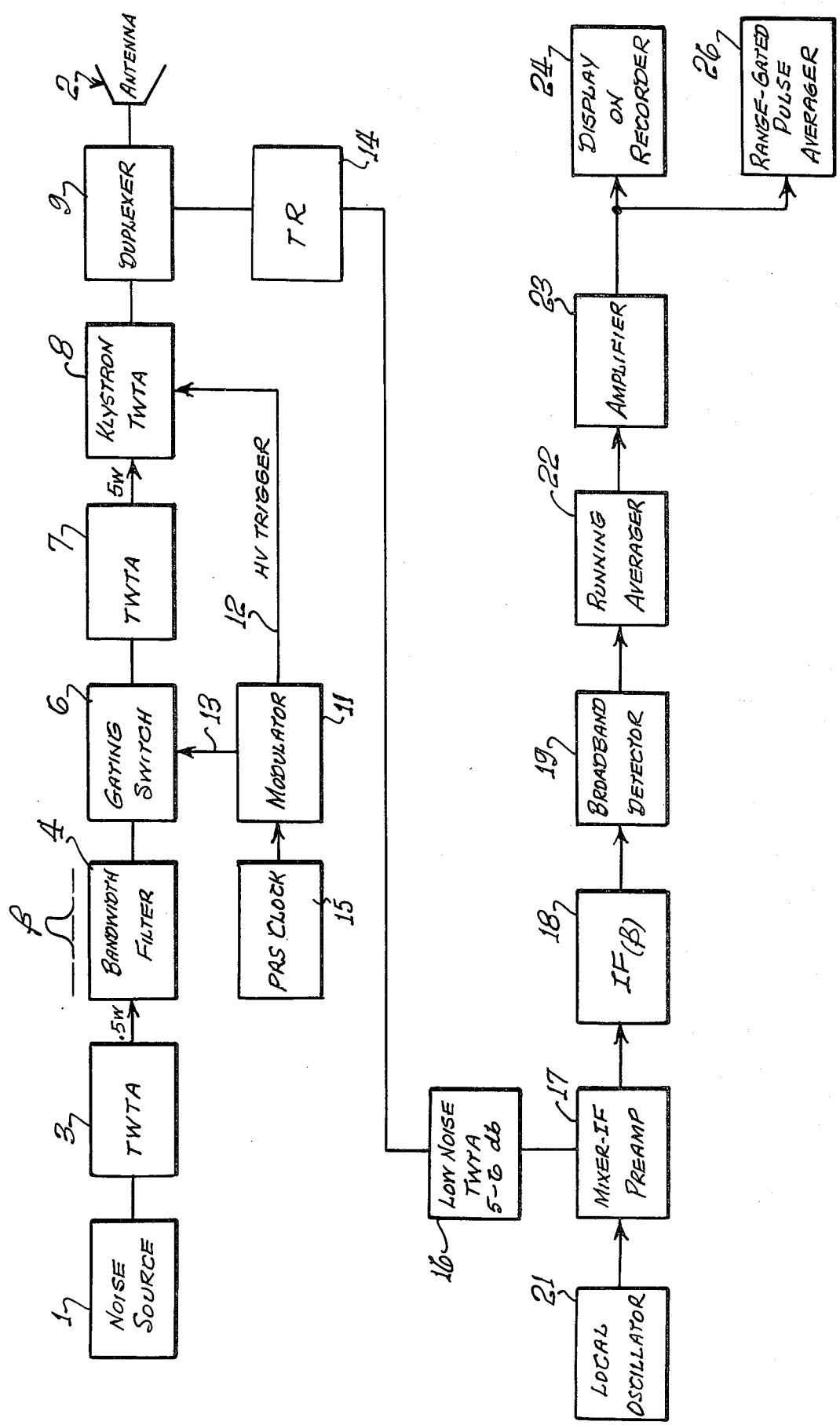

FAST-SCANNING BROAD BAND RADAR SYSTEM

BACKGROUND OF THE INVENTION

The present invention relates to radar systems and, in particular, to systems adapted for 'clutter-type' targets such as clouds.

A striking feature of the radar return from clouds and other "clutter" type targets is the large pulse-to-pulse fluctuation in the received power. One obvious reason for the large fluctuations is that the returns are derived from cloud particles which are randomly-arranged and constantly changing. The same is true for other clutter type targets such as the detection of an aircraft hidden in chaff or small targets obscured by clutter echoes from the sea. The present radar system contemplates all such targets but, since it is primarily concerned with clouds or related meteorological applications, the following description is directed toward these particular applications.

A clearer understanding of the present problem can be obtained by considering a conventional meteorological radar which projects a pulse of a particular, selected frequency leaving the transmitter at time ($T$) and being backscattered by the $i$th cloud particle at range ($R_1$). The scattering amplitude at the receiver can be written:

$$a_i = a_{oi} \sin[(\omega_0 + \omega_i)t + \phi_{oi}],$$

where $a_{oi}$ is the square root of the particle scattering cross-section, and $\omega_0$ is the angular frequency of the transmitter of wavelength $\lambda$. The term $\omega_i = 4\pi v_i/\lambda$ is the Doppler angular frequency associated with the $i$th particle whose component of velocity along the radar beam is $v_i$. The phase angle $\phi_{oi}$ referred to the transmitter is $4\pi r_{oi}/\lambda$.

For an extended target such as a cloud, the signal reaching the receiver at a particular instant is the sum of the backscattered signals from all the particles contained in a volume whose length is one-half the pulse length and of cross-section equal to the area illuminated by the beam.

With a receiver using conventional square law envelope detection, the instantaneous power is proportional to the square of the amplitude, and is given by:

$$I = A^2 = [\Sigma a_i]^2 = \Sigma_i a_{oi}^2 + \Sigma_{i \neq j} a_{oi} a_{oj} \cos[(\omega_i - \omega_j)t + \phi_{oi} - \phi_{oj}] \quad (Eq. 1)$$

where $A$ is the sum of the individual scattering amplitudes.

The first sum over all the scattering cross-sections is proportional to the average received power, or the mean intensity, and is designated by $\overline{A^2}$. It is this quantity which is desired as a measure of cloud reflectivity or rain intensity.

The second term containing the cosine represents the fluctuations or deviations from the mean, and is due to the relative velocities of the scatterers. This "phase noise" term can be interpreted as the spectrum of Doppler beat frequencies resulting from the finite width of the particle velocity spectrum. Note that if $\omega_i = \omega_j$, i.e., if the particle velocity components $v_i$ and $v_j$ along the beam are equal, the fluctuation rate goes to zero. Thus, the broader the size distribution, the greater will be the fluctuation rate.

Since a single radar pulse samples only one particular random arrangement of cloud particles at any given instant, the expectation value for the cosine term is not zero. A second pulse at a later time will sample another of an infinite number of possible particle arrangements, thus providing a second value for the total backscattered power. It is thus not possible to specify the backscattered intensity precisely. The probability distribution of the intensity $A^2$ for a single measurement is given by $$P(A^2)dA^2 = (1/\overline{A^2})e^{-A^2/\overline{A^2}} dA^2$$

where $\overline{A^2}$ is the mean or true value of intensity. The important consideration to be derived from this relationship is that the root mean square (RMS) error in the estimate of the intensity from a single pulse is equal to the mean, $\overline{A^2}$. In other words, the RMS error is so large that the estimate of $\overline{A^2}$ from a single pulse can be either double the mean or zero since, as noted, the error is equal to the mean, $\overline{A^2}$.

The above discussion shows that a single measurement is essentially useless as an estimate of cloud reflectivity or rain intensity. In meteorological radars it is therefore customary to average the returns from a large number of independent samples. It is precisely at this point that conventional weather radars, which transmit a single frequency pulse, suffer a constraint which severely limits their scanning speed.

Generally, the number of independent samples which are averaged to improve the estimate of mean reflected power is chosen as a compromise between the need for following rapidly changing phenomena, such as vigorous thunderstorms, and the desired accuracy of the reflectivity estimate. The standard deviation (rms error) for an average of k independent samples of intensity is: $\overline{A^2}/\sqrt{k}$. To obtain an intensity estimate with a standard deviation of 10 percent, it is necessary to average 100 independent samples. Averaging 15 independent samples gives a standard deviation of 25 percent.

The rate at which independent samples may be obtained from clouds is not simply a function of the pulse repetition frequency. If it were, increasing the PRF of the radar consistent with the desired unambiguous range would in some cases remove the scanning speed limitation. Unfortunately, the limitation is imposed primarily by the distribution in fall velocity of the scatterers which determines the rate of rearrangement, and hence, the time interval necessary before a new pulse will provide an independent sample. This can be seen by again examining the cosine term in equation (1); the fluctuation rate is determined by the distribution of particle velocities, or the width of the Doppler spectrum. As an example, for snow, whose Doppler spectrum exhibits a width of about 0.3 M/sec, an independent sample is possible every 15 msec with a 3 cm radar. For a 10 cm radar, the time to independence is approximately 50 msec. On the other hand, in a vigorous thunderstorm, the width of the Doppler spectrum may be as high as 8 or 10 M/sec, so that a 3 cm radar will obtain an independent sample every millisecond.

The nature of the problem also becomes very clear when calculations of the required scanning rate of such single frequency radars is considered. Thus, calculations can be made of the maximum scanning rate for a single frequency radar of 3 cm wavelength (9000 MHz) and an antenna bandwidth of 1.5°. Choosing the most favorable case of one millisecond for the time to independence (PRF = 1 KHz), and asking that the reflectivity estimate lie within ±20 percent of the true mean (±1db), it can be calculated that averaging 25 samples per beamwidth will be necessary. It will take 360 sec, or 6 minutes, to scan a hemisphere of sky. In view of the average thunderstorm cell life of about 25 minutes, four samples per storm is hardly adequate to study the dynamics of growth. Even one sample of sky which takes 6 minutes to obtain can hardly be called a "snapshot". The situation is obviously much worse for snow. For a 10 cm radar of the same beamwidth, it will take about 20 minutes to scan a hemisphere.

SUMMARY OF THE INVENTION

A principle object of the invention is to provide a radar system capable of averaging a large number of independent clutter return samples within a single pulse of about one microsecond.

Another related object is to provide a fast-scanning meteorological radar having a suitable narrow scanning beam and being capable of scanning one hemisphere of sky within about 20 seconds.

A further object is to provide a clutter type radar capable of providing the mean reflected power information with sufficient accuracy to permit a reflected power estimate with an uncertainty considerably less than 0.6 db.

Other important objects and their attendant advantages will become more apparent in the ensuing description.

The objects of the invention are achieved principally by the use of transmitted noise pulses of a predetermined bandwidth and of a predetermined length. As will be described, the nature of broadband noise is such that the correlation time of the noise is short compared with the transmitted pulse length. The relative shortness permits an averaging of a significant number of independent samples within the single transmitted pulse period. Since the pulse lengths may be in the order of one microsecond, rapid scanning techniques are permitted.

BRIEF DESCRIPTION OF THE DRAWINGS

The invention is illustrated in the accompanying drawings of which the single FIGURE is a block diagram of the transmitting and receiving components of the present system.

DETAILED DESCRIPTION OF THE DRAWINGS

The problems inherent in the conventional single frequency transmitters are resolved by primarily substituting a broadband noise source for the single frequency. In the manner to be described, the necessary averaging is accomplished within a single R. F. noise pulse. The noise source of the pulse can be conventional as is the noise produced by the source. In other words, the invention contemplates the use of a noise pulse formed of totally random frequency components having no particular coherency.

Before considering the specific hardware used in implementing the present radar, it would seem helpful to consider the underlying principles upon which the system is predicated.

Consider a noise source whose spectrum in the frequency domain can be represented by a rectangular function of width $\beta$. The Fourier transform of this function is a $(\sin x)/x$ function in the time domain. The properties of this function are well-known, and the time $\tau$ for which it first becomes zero is related to the bandwidth $\beta$ by $\tau = 1/\beta$. $\tau$ is called the correlation time, and for present purposes, may be interpreted for the noise source in the same way as the time to independence previously discussed for clouds. $\tau$ is the time duration during which the noise source may be considered as consisting of a particular and stationary set of random amplitudes and phases. After the time $\tau$, the noise consists of a new set. Thus, a noise source of bandwidth $\beta$ provides an independent electric field configuration every $\tau$ interval in time. The broader the bandwidth, the shorter the correlation time $\tau$. If the radar sends out a noise pulse of duration $T$ long compared to $\tau$, the number of uncorrelated noise configurations will be $T/\tau = \beta T$. For a noise pulse one microsecond long and bandwidth 100 MHz, the number of independent noise configurations within the pulse will be $100 \times 10^6 \times 10^{-6} = 100$. As the pulse moves through a cloud, each volume of cloud $c\tau$ long, where $c$ is the velocity of light, will be illuminated by an independent part of the pulse. At the receiver, if the returns are integrated for a time $T$ equal to the pulse duration, the integrating function effectively produces an average over the returned power from one hundred independent samples. The expected RMS deviation from the true mean power is then given by $\overline{A^2}/\sqrt{\beta T} = \overline{A^2}/10$. As already pointed out $\overline{A^2}$ is the mean reflected power which is the desired measure of cloud reflectivity or rain intensity. The estimate of the mean reflected power is now $\overline{A^2}(1 \pm 0.1)$ or within 10 percent. Thus, the radar accomplishes the averaging of 100 independent samples within a single 1 microsecond pulse.

Our actual estimate of the mean reflectivity is degraded because the noise power, by its intrinsic nature, also fluctuates, so that the estimate of the transmitted power also is subject to uncertainty. The RMS fluctuations of the noise also involve the same factor, $1/\sqrt{\beta T}$, so that a practical estimate of the mean reflected power is given by $\overline{A^2} + 0.2 \overline{A^2}$, or an expected RMS deviation of 0.79 db. This is equivalent to averaging 25 independent pulses with a single frequency radar.

A further improvement in the performance of the noise radar may be obtained by averaging successive received pulses in order to improve the estimate of the transmitted noise power. Since successive noise pulses are independent, the PRF can be increased by averaging k successive pulses. This averaging improves the noise power estimate by the factor $1/\sqrt{k}$. The estimate of the mean reflectivity can now be given by:

$$\overline{A^2}(1/\sqrt{k\beta T} + 1/\sqrt{\beta T}) = \overline{A^2}[(1+\sqrt{k})/\sqrt{k\beta T}]: \quad \text{(Eq. 2)}$$

Using the previous values for $\beta$ and $T$, and averaging 8 successive pulses gives an estimate with standard deviation of $0.135 \overline{A^2}$ or within 0.5 db. This value is equivalent to averaging 70 independent pulses with a single frequency radar.

As noted, the foregoing example used an average over eight pulses to correspond to the conditions under which the present radar operates. With a PRF of 4 KHz (20 mile unambiguous range) the reflectivity estimate of $\pm 0.5$ db is accomplished in 2 msec. A single frequency radar would take 70 msec to provide the same estimate of mean power.

The time to independence of 1 msec used in the foregoing example is undoubtedly optimistic. A more realistic value for a 3 cm radar is 3 msec in moderate thunderstorm conditions. The single frequency radar would then take 0.21 seconds to average 70 independent pulses. A factor of 100 increase in scanning speed has therefore been accomplished without sacrificing the accuracy of the reflectivity estimate.

There is, of course, a penalty which must be paid for the fast scanning rate. A broadband receiver matching the bandwidth of the noise source introduces additional noise so that the minimum detectable signal, MDS, is now increased. But for meteorological targets, the problem of an increased MDS is of little importance. Since the cross-section for Rayleigh scattering from water drops is proportional to the sixth power of the radius, a droplet of 100 micron diameter, if barely detectable with a single frequency radar, will have to grow only to 133 microns before its cross-section increases by a factor of 10. At normal growth rates in cumulus clouds, the time involved should amount to no more than 30 seconds. Such a delay in detecting the initial echo is of little consequence.

One implementation of the principles of the invention is shown in the drawing. As will become apparent, this implementation utilizes conventional, commercially-obtainable components. Further, except for the present use of a noise source, such as source 1, and the use of certain averaging or integrating techniques which will be described, the technology used in combining the components is conventional radar technology. Noise source 1, however, is conventional to the extent that it can be provided in any known manner and, of course, the term noise is intended to mean the generation of a signal having randomly-varying amplitudes and phases. So-called 'white' noise or Gaussian noisE can be used if desired.

For better understanding, the illustrated implementation can be considered as applicable to the design of a particular short-range, fast-scanning radar having a 3 cm (9000 MHz) wavelength. Such a radar is intended for use up to about 20 miles and it is especially useful in research where the clouds of interest are primarily overhead or within 15 miles. In this short-range application, it is necessary to scan the entire hemisphere although, since the clouds are close, a small diameter antenna, such as antenna 2, can be used to provide good spacial resolution.

By way of illustration, such a short-range, fast-scanning radar requires that it be capable of scanning one hemisphere of sky in 20 seconds with a resolution of 1500 feet which is the diameter of the maximum area illuminated at 10 miles. This resolution requires an antenna having a 2° beamwidth and, for this purpose, antenna 2 can be a parabolic dish having a 48 inch diameter. Preferably, both sides of the dish are covered with a thin hemispherical radome to form a sphere and cut down on wind friction. Although the scanning movement or action is somewhat optional, it is preferred to utilize a type of scan in which there is a continuous movement of the dish antenna in the vertical plane to yield a Range-Height presentation coupled with an azimuth rotation of one beam width for every 360° rotation in elevation. Such a condition requires the ability to scan 90 × 180 beamwidths in 20 seconds for complete hemispheric coverage. This scan in turn, yields an antenna dwell time of 1.23 microseconds per beamwidth. The rate of rotation then becomes 180 beamwidths × 1.23 microseconds = 0.22 seconds/revolution or 4.5 revolutions/second. For an unambiguous range of 20 miles, a pulse repetition frequency (PRF) of 4 KHz can be used.

As noted, the rotational speed of the antenna in elevation is 4.5 revolutions/second. The azimuthal speed then is one-ninetieth of the speed in elevation. In practice, the two drive systems for the elevational and azimuthal movements can be coupled through a fixed gear drive having a 90:1 gear ratio.

Other designs, of course, would be used for other purposes such as for long-range fast-scanning radars. To provide the long-range capacity, the radar obviously requires a larger antenna. In fact, since the size of the dish needed for such work is so large that rapid rotation is not feasible, another solution such as the use of a stationary Luneberg lens is needed. As known, these lenses use a light-weight feedhorn. For example, a 15 meter diameter lens can be used and a feedhorn rotated around the lens about a vertical axis so as to present a Plan-Position display. At long ranges this type of display is preferable since the elevation angles seldom exceed 15°. To cover a total of 360° in azimuth and 15° in elevation and permit this coverage to be achieved in about 1 minute, it can be calculated that the scan rate must be 1 beamwidth every 5 milliseconds or a feedhorn rotation rate of one-half revolutions/second. Such a scanning rate is easily realizable. All other components of the long-range radar, except for the R. F. frequency and the PRF are similar to the short-range radar. Again, however, the present reference to these two particular radars, i.e., the short-range and the long-range, is intended to be illustrative only and, clearly other radar designs not necessarily limited to meteorological applications, would involve modifications to suit the particular circumstances.

Referring specifically to the drawing which, as stated, is designed for short-range cloud research, the noise signal produced by noise source 1 is applied to a low-power, travelling wave tube amplifier 3 (TWTA) which, preferably, has a noise figure of 30–35 db and a gain of about 65 db. The output of TWTA 3, which is at about 0.5 watt, is processed through a bandwidth filter 4 to produce a noise signal having the previously-mentioned bandwidth $\beta$ of a predetermined and fixed value. For example, an operative short-range radar uses a bandwidth of 100 MHz centered about a predetermined frequency best suited for the particular application of the radar or, in the present instance, best suited for the present short-range cloud research which may be in the neighborhood of 9000 MHz. There are, of course, a number of commercially-available filters suitable for the present purposes. The output of the filter is applied through a gating switch 6 which functions in a manner to be described and then to TWTA 7 which is adapted to bring the drive power up to about 5 watt. The final transmitter tube 8 also can be a travelling wave tube amplifier of a Klystron amplifier which has the desired bandwidth of 100 MHz and a peak power output of 50–100 KW. If a Klystron is used, it must be adjusted for bandwidth $\beta$. The output of transmitter tube 8 is applied in a conventional manner through a duplexer 9 to previously-described antenna 2. Backscatter returns from the transmission also are received by antenna 2 and applied by duplexer 9 to the receiving section of the radar.

A further feature of the present invention is the fact that its pulsed output of the $\beta$-width noise pulse must have a predetermined and known duration time $T$ or, in other words, a known pulse length. In the present implementation, the pulse length is determined by employing a modulator 11 which may be fed by a pulse generator to generate a high voltage trigger pulse that is applied to transmitter tube 8. As shown, the high voltage trigger pulse is applied to the tube through line 12 and its function is to turn-on the tube so that its input is amplified and applied to the antenna. For efficiency in operation, the arrangement also contemplates applying a low trigger pulse from modulator 11 to gating switch 6, this pulse being applied through line 13 and being used to activate switch 6 in such a manner that the noise signal derived from filter 4 is applied to both TWTA 7 and 8 synchronously with the activation of TWTA 8 by the high voltage trigger pulse. Such a synchronous arrangement results in increased efficiency in the power requirements of the system. The important consideration is that the pulse length, $T$, is fixed by the high voltage trigger pulse. As stated, the present short-range, fast-scanning radar, may use a pulse length of 1 microsecond for the bandwidth $\beta$ of 100 MHz. Timing circuits provided by an illustrated standard clock system 15 control the trigger pulse lengths as well as other sequences as needed.

The return signals from antenna 2 are applied to the receiver section through a conventional transmit-receive (TR) switch 14 which, in the present implementation, is used primarily to protect the receiver from the high power. In practice, a reference signal also can be applied to transmit-receive switch to provide the reference needed to time the return trip of the output pulses so as to yield range data. As will be appreciated, the obtaining of such range data, as well as elevation and other data is contemplated although it is not a part of the present invention. Preferably, the input from TR switch 14 is applied to a low noise TWTA 16 used to limit the incoming noise figure to about 5–6 db. The amplified returns from TWTA 16 then are applied to a mixer-I.F. preamplifier 17 followed by an I.F. amplifier 18 and a broadband detector 19. These components must be capable of handling the necessary I.F. bandwidth of 100 MHz. In other words, both amplifiers 17 and 18, as well as detector 19 should be of a broadband width to match $\beta$ of bandwidth filter 4. Broadband detector 19, for example, may utilize a Tunnel diode or other broadband devices to rectify the signal in known manners. A local oscillator 21 is used for mixer-I.F. section 17 and such an oscillator also is a standard component.

A significant feature of the invention is the use of a running averager or integrator 22 to receive and integrate the output of detector 19. As has been pointed out, the primary purposes of the present invention are achieved by integrating all of the returns over a time T that is equal to the pulse duration or, in the present example, equal to a pulse time of 1 microsecond over the return signal. Thus, running integrator 22 provides continuous integration of 1 microsecond over the return signal. As has been pointed out previously, the significance in the use of integrator or averager 22 is predicated upon the fact that a noise source of a particular bandwidth $\beta$ (100 MHz) provides an independent electrical field configuration every $\tau$ interval of time. $\tau$ is the time duration in which the noise source may be considered as consisting of a particular and stationary set of random amplitudes and phases. Thus, after the time $\tau$, the noise consists of a new set. Consequently, for a noise pulse of duration $T$ (1 microsecond), there will be a number of uncorrelated noise configurations which, mathematically considered are $T/\tau = \beta T$. In the example under consideration, a noise pulse of 1 microsecond long and a bandwidth 100 MHz involves a number of independent noise configurations within the pulse amounting to $100 \times 10^6 \times 10^{-6} = 100$. Consequently, integration by integrator 22 for a time $T$ equal to the pulse duration amounts to averaging the return power from 100 independent signals. The ability to average this number of independent signals permits an estimate of mean reflected power $\overline{A^2}$ which is $\overline{A^2}$ (1 ± 0.1) or within 10 percent. The real advantage of the present invention thus becomes apparent in that it accomplishes the averaging of 100 independent samples within a single 1 microsecond pulse. This advantage is to be contrasted with the length of time required for the conventional single frequency radars to obtain an averaging of 100 independent samples.

The output of running averager 22 then is amplified in a suitable amplifier 23 and displayed or recorded in an appropriate read-out device 24. Digitizing, of course, can be employed as desired.

Another significant aspect of the present system is the use of a pulse averager 26 to gate particular ranges for a plurality of successive noise pulses and to average the values of these gated ranges. As has been previously explained, any actual estimate of the mean cloud reflectivity is automatically degraded because the noise power, by its intrinsic nature, fluctuates so that the estimate of the transmitted power also is subject to uncertainty. Range-gated pulse averager 26 improves the performance of the noise radar by improving the estimate of the transmitted noise power. For example, the manner in which the noise power estimate can be improved by averaging K successive pulses has been mathematically provided by equation 2. As also pointed out, if the values of the bandwidth, $\beta$, and the pulse length, $T$ (100 MHz and 1 microsecond, respectively) are used, an averaging of 8 successive pulses by range-gate averager 26 yields an estimate with a standard deviation of 0.135 $\overline{A^2}$ or a value within 0.5 db. This value is equivalent to averaging 70 independent pulses with the conventional single frequency radar. The integration or averaging achieved by averager 26 can involve standard integration techniques. As stated, the objective is to gate particular ranges into the averager and to average the values of each range gate over a plurality of successive pulses. This technique, as stated, improves the estimate of the transmitted noise power so as to permit an improvement in the estimate of the cloud reflectivity value $A^2$ which is the output of the present radar system. The use of averager 26 is manifestly advantageous but, as will be appreciated, it is not essential to the basic concept of obtaining the cloud reflectivity value within the time frame of a single pulse such as the 1 microsecond pulse. If averager 26 is used to integrate over, for example, a 10 mile range, it would involve a large number of gates and its implementation best would be accomplished digitally.

It is believed that the operation and implementation of the present radar is fully explained in the foregoing description. Fundamentally, its principle advantage lies in its ability to obtain reliable reflectivity data within an extremely short period of time represented by a single outgoing noise pulse. The radar which has been described is one that is particularly useful in cloud research or in other meteorological applications. However, there are a variety of targets in which the same phenomenon of widely-varying, back-scattered fluctuations present the same problems. For example, the phenomenon of glint or scintillation in the radar return from aircraft targets is a fluctuation produced by the change in phase relationship between the returns of separate parts of the same target. Consequently, this type of target involves "phase noise" which can be reduced through the use of the present broadband noise pulse. Another area in which the present radar advantageously can be used is that involving the clutter echo from the sea. Here again, the wave motions produce a phase noise which cause radar echoes from the ocean to fluctuate in amplitude. Since the sea is indeed an extended source, small targets on the surface must always show up within an area of clutter. Manifestly, the small targets more easily can be distinguished if the clutter fluctuations can be reduced. This reduction is possible through the use of the broadband noise pulses which have an appropriate center frequency. The improvement lies in stabilizing the background in which the target is embedded rather than the complete elimination of the clutter.

Obviously many modifications and variations of the present invention are possible in the light of the above teachings. It is therefore to be understood that within the scope of the appended claims the invention may be practiced otherwise than as specifically described.

We claim:

1. A radar system for providing the mean reflected power of return signals derived from randomly-arranged constantly-changing clutter type targets, comprising:
    a noise source,
    means coupled to said noise source for producing a series of noise signal output pulses each having a predetermined bandwidth centered on a predetermined frequency and each having a predetermined pulse length,
    transmitting means coupled to said series output for driveably transmitting each of said output pulses in a single undivided form into said clutter type targets, said bandwidth and pulse length being predetermined to assure the inclusion of a plural number of individual uncorrelated electrical field noise configurations in each of said single transmitted pulses,
    receiver means matched to said bandwidth for receiving said return signals, and
    return signal processing means including:
        means for integrating the reflected power of each of said return signals over the full pulse length period of each of said single transmitted pulses whereby the reflected power of each return signal is averaged for all of said individual configurations to produce a mean intensity value for said reflected power, and
        indicator means for providing said mean intensity value.

2. The system of claim 1 wherein the power of said transmitter means used for repetitively driving said pulses is subject to noise-related power fluctuations whereby the true mean intensity value of said returns includes an estimate of said fluctuations,
    said system further including means for averaging the returns of a selected number of said repetitive pulses for improving said estimate.

3. The system of claim 1 wherein said predetermined bandwidth is within a range of about 1 – 10 percent of said center frequency and said center frequency lie in the range of about 2500–10,000 MHz.

4. The system of claim 3 wherein said bandwidth is about 100 MHz centered on a frequency of about 9000 MHz and said noise pulse period is 1 microsecond.

5. The system of claim 4 wherein said transmitting means includes a mechanically-rotated fast-scanning antenna having about a 2° beamwidth,
    said system being adapted for cloud target returns and said antenna being rotated at a speed capable of scanning one hemisphere of sky within about 15 seconds.

6. The system of claim 1 wherein said transmitting means includes a two stage amplifier and means for generating the driving power for said driven pulses,
    said system further including:
        a gating switch, and
        a modulator means adapted to produce both low and high voltage trigger pulses,
    said gating switch being responsively coupled to said low voltage pulse for operatively applying said noise signal to the first stage of said amplifier means, and
    said second stage of the amplifier means being responsively coupled to said high voltage pulse for rendering said second stage operative when said first stage is receiving said signal, said high voltage trigger pulse determining said pulse length period.

* * * * *